US011816997B2

United States Patent
Alexander et al.

(10) Patent No.: US 11,816,997 B2
(45) Date of Patent: Nov. 14, 2023

(54) DEMAND DRIVEN CROWDSOURCING FOR UAV SENSOR

(71) Applicant: GE Aviation Systems LLC, Grand Rapids, MI (US)

(72) Inventors: Christopher Alexander, Boston, MA (US); Michael Joseph Kuhlman, Malden, MA (US)

(73) Assignee: GE Aviation Systems LLC, Grand Rapids, MI (US)

( * ) Notice: Subject to any disclaimer, the term of this patent is extended or adjusted under 35 U.S.C. 154(b) by 173 days.

(21) Appl. No.: 17/244,069

(22) Filed: Apr. 29, 2021

(65) Prior Publication Data

US 2022/0351630 A1 Nov. 3, 2022

(51) Int. Cl.
| | | |
|---|---|---|
| *G08G 5/00* | (2006.01) | |
| *G05D 1/00* | (2006.01) | |
| *B64C 39/02* | (2023.01) | |
| *B64U 101/00* | (2023.01) | |

(52) U.S. Cl.
CPC ......... *G08G 5/0039* (2013.01); *B64C 39/024* (2013.01); *G05D 1/0027* (2013.01); *G05D 1/0094* (2013.01); *G08G 5/0026* (2013.01); *B64U 2101/00* (2023.01)

(58) Field of Classification Search
CPC .. G08G 5/0039; G08G 5/0026; B64C 39/024; B64C 2201/12; G05D 1/0027; G05D 1/0094
See application file for complete search history.

(56) References Cited

U.S. PATENT DOCUMENTS

| | | | |
|---|---|---|---|
| 8,639,396 B1 * | 1/2014 | Hirsch | G05D 1/104 |
| | | | 340/995.13 |
| 9,488,492 B2 | 11/2016 | Samarasekera et al. | |
| 10,130,232 B2 | 11/2018 | Atchley et al. | |
| 10,223,753 B1 * | 3/2019 | Marlow | B64C 39/024 |
| 10,322,801 B1 * | 6/2019 | Yeturu | G06Q 10/083 |
| 2006/0114324 A1 * | 6/2006 | Farmer | G01S 7/003 |
| | | | 709/201 |
| 2014/0074339 A1 * | 3/2014 | Casado | G05D 1/00 |
| | | | 701/24 |
| 2015/0168144 A1 | 6/2015 | Barton et al. | |
| 2015/0323931 A1 * | 11/2015 | Downey | G05D 1/0011 |
| | | | 701/2 |

(Continued)

FOREIGN PATENT DOCUMENTS

| | | |
|---|---|---|
| JP | 2018165932 A | 10/2018 |
| WO | 2015073827 A1 | 5/2015 |

(Continued)

OTHER PUBLICATIONS

Great Britain Combined Search and Examination Report for Application No. GB2205102.3 dated Oct. 7, 2022 (6 pages).

*Primary Examiner* — Anne Marie Antonucci
*Assistant Examiner* — Connor L Knight
(74) *Attorney, Agent, or Firm* — Dinsmore & Shohl LLP

(57) ABSTRACT

A method may include receiving a request for a first set of data to be gathered by an unmanned aircraft system. A first unmanned aircraft system may be identified that is capable of gathering the first data. A request may be transmitted to the first unmanned aircraft system to gather the first set of data. The first set of data gathered by the first unmanned aircraft system may be received.

15 Claims, 4 Drawing Sheets

(56) References Cited

U.S. PATENT DOCUMENTS

| | | | |
|---|---|---|---|
| 2016/0110701 A1 | 4/2016 | Herring et al. | |
| 2016/0124434 A1 | 5/2016 | Gariepy et al. | |
| 2017/0116558 A1* | 4/2017 | Pierz | B64C 39/024 |
| 2018/0033312 A1* | 2/2018 | DeLuca | G08G 5/0017 |
| 2018/0350245 A1 | 12/2018 | Priest | |
| 2018/0357909 A1* | 12/2018 | Eyhorn | G08G 5/0039 |
| 2019/0227554 A1* | 7/2019 | Cantrell | G05D 1/0088 |
| 2019/0245609 A1* | 8/2019 | Ziskin | H04L 65/612 |

FOREIGN PATENT DOCUMENTS

| | | |
|---|---|---|
| WO | 2017184920 A1 | 10/2017 |
| WO | 2018156284 A1 | 8/2018 |
| WO | 2018165093 A1 | 9/2018 |
| WO | 2019025872 A2 | 2/2019 |

\* cited by examiner

DEMAND DRIVEN CROWDSOURCING FOR UAV SENSOR

FIELD

The present disclosure relates to data collection by unmanned aerial vehicles, and more specifically, to demand driven crowdsourcing for UAV sensor data.

BACKGROUND

Unmanned aerial vehicles, or drones, are increasingly being flown either for commercial or other purposes. Drones typically fly at low altitudes (e.g., below 400 feet) and may fly in a variety of geographic areas in a variety of environments. Drones may be flown for a variety of purposes including commercial (e.g., package delivery), research (e.g., gathering data in certain areas), among others. Drones may be equipped with a variety of sensors or other equipment that may gather data as a drone is flown. In some examples, data captured by a drone may be used to navigate the drone. In other examples, data captured by a drone may be used for research or other purposes (e.g., by gathering weather data, survey data, and the like).

An entity (e.g., a corporation, a government agency, or the like) that wishes to obtain data from various locations for research or other purposes may desire to use one or more drones equipped with appropriate sensors to gather the data. The one or more drones may then fly to the appropriate locations and capture the desired data. However, it may be expensive, time-consuming, or otherwise challenging for certain entities to either maintain one or more drones for such operations or to hire or contract drones for such operations. Instead, it may be desirable to leverage other drones operated by other unrelated entities to collect data. Therefore, there exists a need for demand driven crowdsourcing for UAV sensor data.

SUMMARY

In an embodiment, a method may include receiving a request for a first set of data to be gathered by an unmanned aircraft system, identifying a first unmanned aircraft system capable of gathering the first set of data, transmitting a request to the first unmanned aircraft system to gather the first set of data, and receiving the first set of data gathered by the first unmanned aircraft system.

In an embodiment, an apparatus may include one or more processors, one or more memory modules, and machine-readable instructions stored in the one or more memory modules. When executed by the one or more processors, the machine-readable instructions may cause the apparatus to receive a request for a first set of data to be gathered by an unmanned aircraft system, identify a first unmanned aircraft system capable of gathering the first set of data, transmit a request to the first unmanned aircraft system to gather the first set of data, and receive the first set of data gathered by the first unmanned aircraft system.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

The present disclosure generally relates to a data management system. In the illustrated example, the data management system may be used to store and manage data captured by unmanned aircraft systems (UAS), as disclosed herein. UAS may also be referred to herein as unmanned aerial vehicles (UAV) or drones. While the examples disclosed herein are directed to a data management system for data gathered by UAS, it should be understood that in other examples, the data management system may manage data gathered by other types of aircraft or other vehicles (e.g., manned aircraft).

UAS may fly through various airspaces for a variety of purposes. For example, UAS may be used to deliver packages to consumers. In other examples, UAS may be used to gather data. In particular, UAS may uniquely be able to access areas that would not be available to ground-based vehicles. Thus, UAS may be able to gather data that would not be able to be gathered by ground-based vehicles.

Because of the large number of UAS that are typically flown and are expected to fly in the future, a large number of UAS may be available for data gathering operations, even if the UAS were not originally planned to be utilized for data gathering. As such, a plurality of UAS, each being flown for their own purposes, may be used to collectively crowd-source data collection, as disclosed herein.

Figure 1:
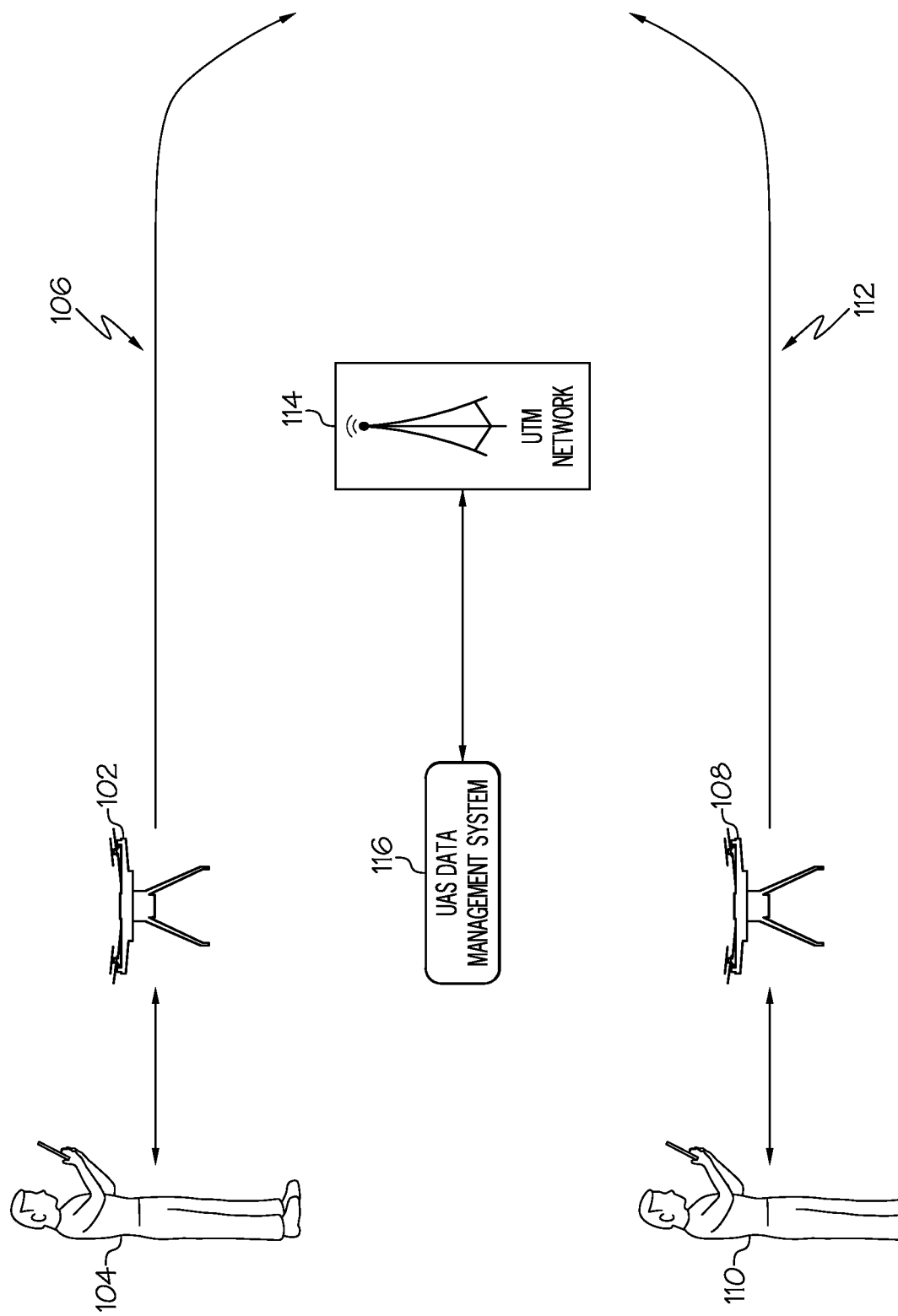
FIG. 1 schematically depicts an environment in which demand driven crowdsourcing for UAV sensor data may be implemented, according to one or more embodiments shown and described herein.

Turning now to FIG. 1, an example environment 100 for crowdsourcing UAS sensor data is shown. In the example of FIG. 1, a first UAS 102, operated by a first UAS operator 104, flies along a route 106, and a second UAS 108, operated by a second UAS operator 110, flies along a route 112. The UAS 102 and 108 may be flown for any number of purposes. For example, they may be flown for commercial purposes (e.g., delivering packages), research purposes (e.g., data collection), by hobbyists, or for other purposes. The first UAS 102 may be controlled and operated by the UAS operator 104 and the second UAS 108 may be controlled and operated by the UAS operator 110. While the example of FIG. 1 shows two UAS 102, 108 being flown, it should be understood that in other examples, any number of UAS may be flown along any number of routes.

A UAS may be monitored by one or more UAS service suppliers (USS). Multiple USS may comprise an unmanned traffic management (UTM) network, wherein each USS manages UAS traffic within a certain geographic area and/or for a certain set of clients. Thus, during a flight, a UAS may be monitored by multiple USS if the UAS travels between different zones of coverage.

A UTM network may authorize and/or de-conflict UAS flight plans before a UAS flight begins and may monitor a UAS during a flight. For example, a UTM network may monitor the flight path of a UAS during a flight using radar or other surveillance technology. A UTM network may notify UAS operators if a UAS veers off course of a scheduled flight plan. A UTM network may also notify UAS operators of potential conflicts that arise during a UAS flight. For example, a UTM network may notify a UAS operator about dangerous weather, other detected aircraft, or aircraft restrictions zones established by the FAA or other entities.

In the example of FIG. 1, the UAS 102 and 108 are monitored by a UTM network 114, which may comprise one or more USS. Thus, the UTM network 114 may communicate with the UAS operators 104, 110 before the flights of the UAS 102, 108 and/or during the flights of the UAS 102, 108. In some examples, the UTM network 114 may also communicate directly with the UAS 102, 108. For example, the UTM network 114 may receive data from the UAS 102, 108 (e.g., telemetry data) and/or may transmit data to the UAS 102, 108 (e.g., radar data).

Each of the UAS 102, 108 may be equipped with certain sensors or other equipment capable of gathering data during their respective flights. However, the flight operations of the UAS 102, 108 may not call for data to be gathered or may call for less data to be gathered than the UAS 102, 108 are capable of gathering. Accordingly, the UAS 102, 108 may have excess capacity for gathering data during their respective flights. As such, it may be desirable for other entities to utilize the UAS 102, 108 to gather sensor data for purposes unrelated to the flights of the UAS 102, 108.

For example, the route 106 of the UAS 102 may travel near an area where a researcher desires survey data. Therefore, it may be desirable to the researcher for the UAS 102 to gather this survey data during its flight and transmit the collected data to the researcher. If the UAS 102 does not have to significantly alter the route 106 and is still able to satisfactorily perform its flight operation, it may be of relatively low cost for the UAS 102 to gather this data. Thus, the UAS operator 104 may charge the researcher a fee for providing this service. Accordingly, the UAS operator 104 may be able to utilize the excess capacity of the UAS 102 and the researcher may be able to obtain the desired survey data for a lower cost than would be incurred by independently purchasing and operating a drone or by hiring a third party to perform a drone flight solely for the purpose of gathering the data.

Accordingly, disclosed herein are systems and methods for connecting UAS operators operating UAS that are able to gather sensor data and entities that desire sensor data from UAS flights. By assembling a network of UAS and UAS operators, researchers and other entities interested in receiving sensor data from UAS may utilize this network of UAS to collect the data. As the UAS network expands, users may have access to an increasing variety of UAS able to gather data at diverse locations and time periods. In addition, as UAS utilizing the disclosed methods and systems continually gather sensor data, the data may be stored such that it can be accessed by users. Accordingly, users desiring particular data may be able to either find the data previously gathered by one or more UAS, or may be able to have a UAS gather the data during a future flight operation.

Referring back to FIG. 1, the environment 100 includes a UAS data management system 116. The UAS data management system 116 may perform the demand driven crowdsourcing for UAV sensor data as disclosed herein. In particular, the UAS data management system 116 may receive requests from users desiring certain data to be collected by one or more UAS, send requests to UAS operators to collect such data, and receive and store the data collected by the UAS, as discussed in further detail below. In the example of FIG. 1, the UAS data management system 116 is shown as separate from the UTM network 114. However, in other examples, the UAS data management system 116 may be integrated into the UTM network 114.

Figure 2:
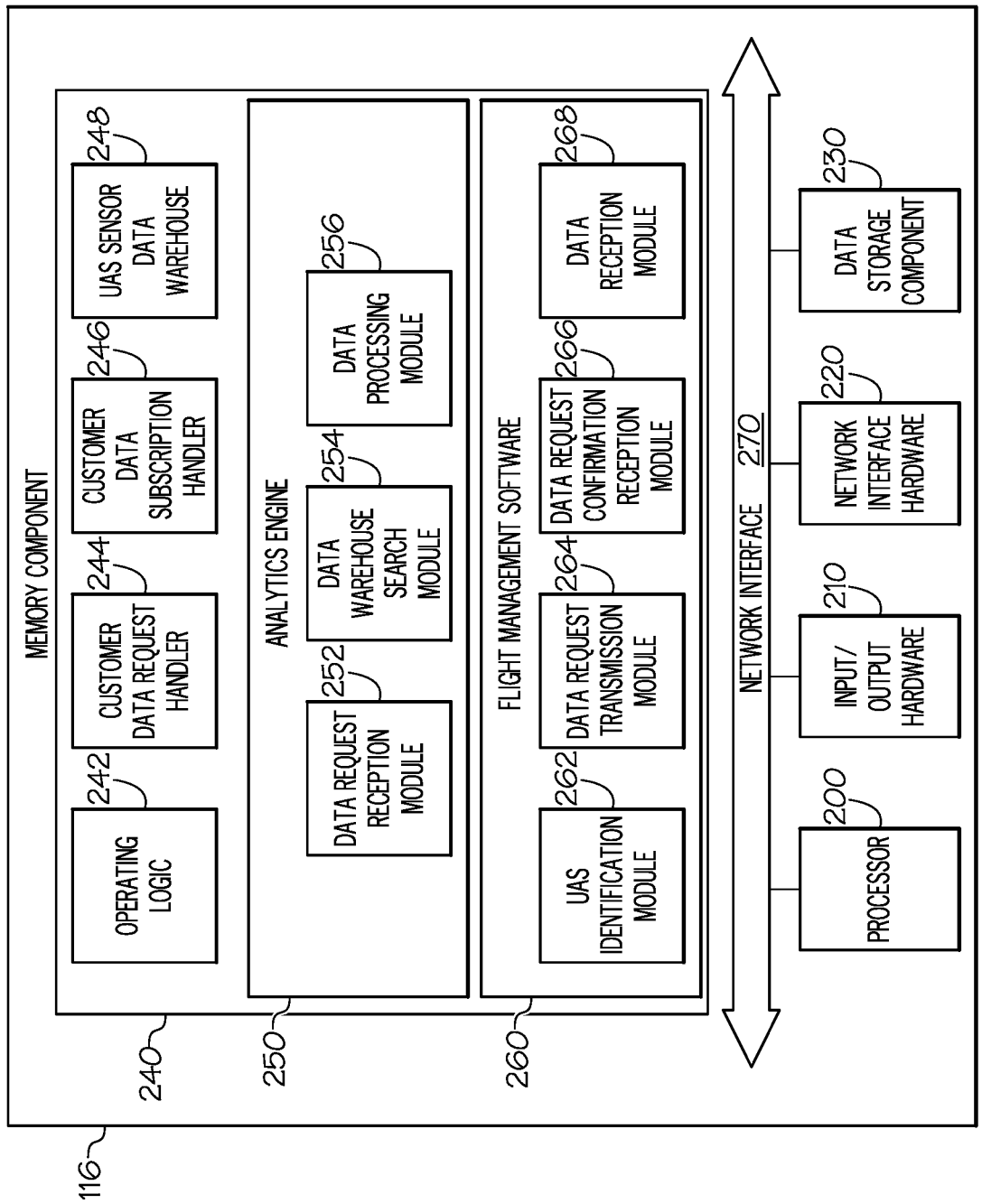
FIG. 2 schematically depicts an example UAS data management system, according to one or more embodiments shown and described herein.

Now referring to FIG. 2, the components of the UAS data management system 116 are schematically depicted. As illustrated in FIG. 2, the UAS data management system 116 may include a processor 200, input/output hardware 210, network interface hardware 220, a data storage component 230, and a non-transitory memory component 240. The memory component 240 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store operating logic 242, a customer data request handler 244, a customer data subscription handler 246, a UAS sensor data warehouse 248, an analytics engine 250, and flight management software 260 (each of which may be embodied as a computer program, firmware, or hardware, as an example). The analytics engine 250 may include a data request reception module 252, a data warehouse search module 254, and a data processing module 256. The flight management software 260 may include a UAS identification module 262, a data request transmission module 264, a data request confirmation reception module 266, and a data reception module 268. A network interface 270 is also included in FIG. 2 and may be implemented as a bus or other interface to facilitate communication among the components of the UAS data management system 116.

The processor 200 may include any processing component configured to receive and execute instructions (such as from the data storage component 230 and/or the memory component 240). The input/output hardware 210 may include a monitor, keyboard, mouse, printer, camera, microphone, speaker, touch-screen, and/or other device for receiving input and outputting information. The network interface hardware 220 may include any wired or wireless networking hardware, such as a modem, LAN port, wireless fidelity (Wi-Fi) card, WiMax card, mobile communications hardware, and/or other hardware for communicating with the UTM network 114, UAS (e.g., UAS 102, 108), UAS operators (e.g., UAS operators 104, 110), and other networks and/or devices.

The data storage component 230 may store information received from UAS (e.g., the UAS 102 or 108 in the example of FIG. 1) or from a UTM network (e.g., the UTM network 114 of FIG. 1). The data storage component 230 may also store other data utilized by the UAS data management system 116, as described in further detail herein.

Included in the memory component 240 are the operating logic 242, the customer data request handler 244, the customer data subscription handler 246, the UAS sensor data warehouse 248, the analytics engine 250, and the flight management software 260.

The operating logic 242 may include an operating system and/or other software for managing components of the UAS data management system 116.

The customer data request handler 244 may handle data requests from customers or users of the UAS data management system 116. As explained above, researchers or other individuals or entities may be interested in utilizing one or more UAS to capture certain data (e.g., using sensors or other equipment installed on or carried by the UAS). In one example, a researcher may be interested in weather data at a particular location (e.g., collected using temperature sensors, wind sensors, pressure sensors, and the like). In another example, a surveyor may be interested in obstacle data in a certain area (e.g., collected using Lidar, Radar, video, still images, and the like). In another example, a telecommunications company may be interested in RF spectrum data in one or more locations (e.g., collected using an RF spectrometer, a link quality indicator, and the like). In another example, a government agency may be interested in crash or incident reports (e.g, collected using accelerator data or post flight reports). While these examples are listed for illustrative purposes, it should be understood that any type of data that can be collected by UAS may be desired by customers and may be requested utilizing the UAS data management system 116, as disclosed herein.

A customer of the UAS data management system 116 may transmit a request for data to the UAS data management system 116, which may be received by the customer data request handler 244. The request may be for any data desired by the customer to be gathered by one or more UAS. The request may specify a variety of information or constraints about the data to be gathered including the type of data to be gathered, the location where the data is to be gathered, a time and/or date when the data is to be gathered, the type of sensor to be used to gather the data, a or a quality or accuracy of data to be gathered (e.g., a data resolution), among other information. In some examples, the request for data may include a range of possibilities regarding data collection. For example, the request may specify that data is to be gathered anywhere within a certain geographic area or within certain hours of the data, or with any one of several types of sensors. For example, a customer may request temperature and humidity data within a certain geographic area and a certain altitude range to be gathered between certain hours of the day. In some examples, the request for data may also specify a fee that the customer is willing to pay to receive the data.

In addition to receiving a customer data request, the customer data request handler 244 may also transmit requested data to the customer after the data has been gathered using the techniques described herein. In some examples, the customer data request handler 244 may also transmit other information to a customer. For example, the customer data request handler 244 may transmit the cost of a particular data request to a customer. In some examples, if the UAS data management system 116 is unable to fulfill a data request for a customer, the customer data request handler 244 may transmit a notification to the customer indicating the inability of the UAS data management system 116 to fulfill the data request.

The customer data subscription handler 246 may handle subscriptions and live streaming of data to customers, as disclosed herein. As described above, the customer data request handler 244 may receive requests for data from customers and may transmit data to those customers once the data has been gathered. In some examples, the data may be processed before it is transmitted, as discussed further below. In embodiments, the customer data request handler 244 transfers all of the gathered data to the customer together after it is gathered and processed. However, in some examples, customers may subscribe to a live data feed and may receive data as it is gathered in real time.

In some examples, customers may register for a subscription with the UAS data management system 116. Specifically, a customer may register for a subscription to a certain data feed with the UAS data management system 116. Then, as data comprising the data feed is received by the UAS data management system 116 (e.g., from a particular UAS), the customer data subscription handler 246 may stream the data feed to one or more subscribers in real time. In some examples, the customer data subscription handler 246 may stream all data received from a UAS to one or more subscribers. In other examples, the customer data subscription handler 246 may stream only certain received data to one or more subscribers (e.g., data that meets certain criteria). For example, a customer may subscribe to receive notifications of pop up obstacles or adverse weather conditions derived from live UAS sensor data. In another example, a customer may subscribe to receive notifications of crashes. The customer data subscription handler 246 may determine when received data is relative to one or more subscribers and may then transmit the relevant data to the appropriate subscribers in real time.

The UAS sensor data warehouse 248 may store sensor data received from UAS. As described above, customers may request data to be gathered by UAS. The UAS may gather the data and the data may be transmitted to the UAS data management system 116. After the UAS data management system 116 receives the data, it may be stored in the UAS sensor data warehouse 248.

Over time, as more data is received from UAS, the UAS sensor data warehouse 248 may build up a large collection of data. Thus, in some instances, a customer may request data that has already been gathered by one or more UAS and is stored in the UAS sensor data warehouse 248. When this occurs, the data may be retrieved from the UAS sensor data warehouse 248 and transmitted to the customer without the need for a UAS to gather the data, as explained in further detail below. Accordingly, by storing received data in the UAS sensor data warehouse 248, the efficiency and functionality of the UAS data management system 116 may be increased.

The analytics engine 250 may analyze data requests received from customers and may process data received from UAS, as described herein. The analytics engine 250 may comprise a data request reception module 252, a data warehouse search module 254, and a data processing module 256.

The data request reception module 252 may receive a request for data from the customer data request handler 244. As explained above, the customer data request handler 244 may receive data requests from customers. After receiving a customer data request, the customer data request handler 244 may transmit the data request to the analytics engine 250, where it may be received by the data request reception module 252. The data request reception module 252 may analyze the customer data request to determine the type of data being requested. In some examples, the data request reception module 252 may determine other information about the data request (e.g., the type of sensor needed to gather the requested data).

The data warehouse search module 254 may search the UAS sensor data warehouse 248 to determine if data requested by a customer is stored therein. As described above, the UAS sensor data warehouse 248 may store data after it is received from UAS. Accordingly, when a request for certain data is received by the data request reception module 252, the data warehouse search module 254 may determine whether the requested data already exists in the UAS sensor data warehouse 248 (e.g., from a previous UAS flight). If the data warehouse search module 254 determines that the data does already exist in the UAS sensor data warehouse 248, then the data may be transmitted directly from the UAS sensor data warehouse 248 to the customer requesting the data without the need for any UAS to collect the data. If the data warehouse search module 254 determines that the data does not exist in the UAS sensor data warehouse 248, then UAS may gather the data, as disclosed in further detail below.

The data processing module 256 may process data before the customer data request handler 244 transmits the data to a requesting customer. The data processing module 256 may process data stored in the UAS sensor data warehouse 248 and/or data received from UAS. In some examples, the customer data request handler 244 may transmit raw data to a customer without processing. However, in many examples, it may be desirable to process data before transmitting the data to a customer.

The data processing module 256 may process data in a variety of ways. In some examples, the particular data processing performed by the data processing module 256 may depend on the type of data being processed. For example, if a customer requests weather data, the data processing module 256 may assimilate temperature, wind, pressure, or other weather data to determine a weather forecast. If a customer requests obstacle data, the data processing module 256 may use a mapping algorithm to identify obstacles based on Lidar, radar, image, video, or other types of data. If a customer requests RF spectrum data, the data processing module 256 may use a mapping algorithm to process data from an RF spectrometer or a link quality indicator. If a customer requests crash or incident reports, the data processing module 256 may analyze accelerometer data or post flight reports to identify crashes.

In some examples, the data processing module 256 may remove private information from data associated with a particular UAS that collected the data. For example, an operator of a commercial UAS may not want the details about the route it is flying to become public. Thus, the UAS operator may be unwilling to gather data for the UAS data management system 116 if gathering the data would allow its proprietary route to become public. Accordingly, the data processing module 256 may obfuscate any private data associated with the UAS collecting data. As such, UAS operators may be confident that gathering data for the UAS data management system 116 will not expose private data about UAS or UAS flights to the public.

The flight management software 260 may act as an interface between the UAS data management system 116 and UAS that may gather data for the UAS data management system 116. The flight management software 260 may comprise a UAS identification module 262, a data request transmission module 264, a data request confirmation reception module 266, and a data reception module 268.

The UAS identification module 262 may identify UAS that are capable of gathering data requested by a customer. In the example of FIG. 1, the UTM network 114 may monitor flights of UAS (e.g., UAS 102, 108). In addition, the UTM network 114 may store information about flight plans for future UAS flights. This information may include routes to be flown by one or more UAS, times that one or more UAS are to be flown, and sensors or other equipment that UAS may have during planned flights. Accordingly, the UAS identification module 262 may communicate with the UTM network 114 to identify UAS that have a future scheduled flight plan such that the UAS are capable of gathering data requested by a customer. For example, if a customer data request seeks weather data at a particular location at a particular time, the UAS identification module 262 may determine whether any flight plans scheduled with the UTM network 114 involve UAS flying near the specified location at the specified time.

In some examples, the UAS identification module 262 may determine whether a portion of any planned routes of UAS are within a threshold distance of the specified location. That is, even if a planned route of a UAS does not include an area where requested data is to be gathered, if the route is close to the desired area, a relatively minor modification may be made to a flight route such that the requested data can be gathered while still allowing the UAS to satisfy its flight purpose, as discussed in further detail below. In some examples, the UAS identification module 262 may determine whether other information associated with any planned routes of UAS are within a threshold metric. For example, the UAS identification module 262 may determine whether a planned flight time of a UAS is scheduled to occur within a threshold amount of time within which data is requested.

In some examples, the UAS identification module 262 may further determine whether any UAS that have a planned route near the specified location are to be equipped with the appropriate sensors (e.g., the types of sensors required to gather the type of data requested). In some examples, if a UAS does not have an appropriate sensor for gathering requested data, the appropriate sensor may be added to the UAS before a scheduled flight such that the data can be gathered, as further discussed below. In the examples described above, the UAS identification module 262 identifies UAS that are capable of gathering requested data based on future planned routes of the UAS. That is, the UAS identification module 262 may identify UAS that are able to gather requested data on a future flight. However, in other examples, the UAS identification module 262 may identify UAS currently in flight that are capable of gathering requested data.

The data request transmission module 264 may send a request to operators of UAS identified by the UAS identification module 262 asking if the operators would be willing to collect requested data during a future flight of the UAS, as disclosed herein. Alternatively, in some examples, the data request transmission module 264 may transmit a request asking if UAS operators would be willing to collect requested data during a current flight of the UAS.

In some examples, if the UAS identification module 262 fails to identify any UAS that are capable of gathering requested data based on future planned routes, the data request transmission module 264 may send a request to one or more UAS operators asking if they would be willing to perform a UAS flight that is not currently scheduled specifically for the purpose of gathering the requested data. In these examples, the UAS data management system 116 may create a flight plan that a UAS may follow to gather the requested data and may transmit the created flight plan along with the request to perform the flight.

Once the UAS identification module 262 identifies UAS that are capable of gathering data requested by a customer, the UAS data management system 116 may offer a UAS operator associated with the identified UAS the opportunity to gather the requested data. In particular, the data request transmission module 264 may transmit a request, to one or more operators of one or more UAS identified by the UAS identification module 262 as capable of gathering data requested by a customer, to gather the requested data. The request may include a variety of information about the data to be gathered including any constraints specified by the customer. For example, the request may include the type of data to be gathered, the location where data is to be gathered, the time when data is to be gathered, and the type of sensor or sensors to be used to gather the data.

In embodiments, the data request transmission module 264 may transmit information about how gathering the requested data will affect a planned route of a UAS. For example, the UAS identification module 262 may identify a particular UAS that has a planned route to fly over an area for which a customer is requesting survey data. The UAS identification module 262 may also determine that the UAS will have the appropriate sensor needed to capture the requested survey data during the flight. As such, the data request transmission module 264 may indicate to the operator of the UAS that the requested data may be captured without any alteration to the planned flight of the UAS.

In other examples, the UAS identification module 262 may identify a particular UAS that has a planned route near a particular area for which one or more customers are requesting survey data. As such, in order for the UAS to capture the desired data, the flight plan of the UAS may need to be modified. Thus, the data request transmission module 264 may indicate to the operator of the UAS the modifications to the scheduled flight plan that would be required in order to gather the requested data. The required alterations to the flight plan may include a modified route or a modified date or time for the flight based on the particular customer data request. Any modified routes may be deconflicted (e.g., by the UTM network 114) to ensure that a modified route does not conflict with any other planned routes. In some examples, the data request transmission module 264 may indicate equipment that needs to be equipped to the UAS in order to gather the requested data (e.g., a particular sensor may need to be installed prior to the planned flight).

In some examples, the data request transmission module 264 may also transmit an amount of compensation that will be provided to the UAS operator for gathering the requested data. Since the UAS operator may not directly benefit from gathering the data requested by a customer, compensation may be offered in order to incentivize the UAS operator to gather the data. In some examples, the compensation offered may be determined by the customer requesting the data. In some examples, the flight management software 260 may determine an amount of compensation offered (e.g., based on how much a flight plan needs to be altered to gather the data). In other examples, the data request transmission module 264 may solicit bids from UAS operators indicating what compensation they would require before agreeing to gather the data. In these examples, one or more bids can be received by the UAS data management system 116, which can be relayed to the customer requesting the data. In some examples, a bid from a particular UAS operator may be calculated automatically (e.g., based on known preferences of the UAS operator such as fuel costs, mission urgency, a known hourly rate, etc.). The customer may then decide whether or not to pay the desired compensation.

After the data request transmission module 264 transmits a request to one or more UAS operators regarding gathering data for a customer, each UAS operator may decide whether they are interested in gathering the data. A UAS operator may consider a number of factors including the inconvenience or additional burden of gathering the data during a UAS flight, the compensation offered, mission urgency, and/or other factors. Once a UAS operator decides whether to accept a request for data gathering, the UAS operator may transmit an acceptance or denial of the request to the UAS data management system 116, as described below.

The data request confirmation reception module 266 may receive, from a UAS operator, a confirmation of an acceptance or a denial of a request to gather data transmitted by the data request transmission module 264. That is, the data request confirmation reception module 266 may receive an indication that a UAS operator agrees to perform data gathering in accordance with a customer data request or does not agree to perform data gathering in accordance with a customer data request. In examples where the data request transmission module 264 solicits a bid for performing a data gathering task, the data request confirmation reception module 266 may receive a bid from a UAS operator.

In some examples, after the data request confirmation reception module 266 receives an acceptance of a data gathering task from a UAS operator, the data request confirmation reception module 266 may transmit a response to the UAS operator confirming that the UAS operator is to gather the requested data and will be paid the agreed upon compensation. In some examples, a contract may be established between the UAS operator and the UAS data management system 116 regarding the data gathering task.

In some instances, the UAS identification module 262 may identify a plurality of UAS that are capable of gathering data requested by a customer during planned flights. When this occurs, in some examples, the data request transmission module 264 may send a request to the operators of all such identified UAS in order to see which operators are interested in gathering the data. The data request confirmation reception module 266 may then receive an indication from each such UAS operator as to whether they agree to gather the requested data. If more than one UAS operators indicate they are interested in gathering the data, in some examples, the data request confirmation reception module 266 may accept the confirmation from the first UAS operator to respond. The data request confirmation reception module 266 may then transmit a response to the first responding UAS operator confirming that they will perform the data gathering task and may transmit a response to later responding UAS operators indicating that another UAS operator has accepted the data gathering task.

In some examples, if multiple UAS operators indicate a willingness to gather requested data, the data request confirmation reception module 266 may solicit bids from each such UAS operator. The data request confirmation reception module 266 may then accept the most favorable bid (e.g., the bid requiring the lowest amount of compensation to perform the data gathering task). The data request confirmation reception module 266 may then transmit a confirmation of acceptance to the UAS operator submitting the most favorable bid and may transmit an indication to the other responding UAS operators that another bid has been accepted.

In some examples, when the UAS identification module 262 identifies multiple UAS that are capable of performing a data gathering task, the data request transmission module 264 may transmit a request to collect the data to an operator of only one of the identified UAS. For example, the data request transmission module 264 may transmit a request to the operator of the UAS having future flight plan that needs to be modified the least. After the data request transmission module 264 transmits the request, if the data request confirmation reception module 266 receives an acceptance of the requested data gathering task, no other UAS operators need to be contacted. However, if the UAS operator does not accept the requested data gathering task, then the data request transmission module 264 may transmit a request to another of the identified UAS capable of performing the data gathering task. This process may continue until the data request confirmation reception module 266 receives an acceptance of the request. If no UAS agrees to gather the requested data, then the customer data request handler 244 may transmit a notification to the customer requesting the data indicating that the UAS data management system 116 is currently unable to fulfill the data request.

In some examples, the data request transmission module 264 may transmit multiple data requests to the same UAS for different data collection missions. Data requests may be processed jointly or sequentially if mission constraints so permit. Costs may be shared among data requestors equitably. In examples where bids are accepted, cost sharing may result in previous bids being lowered.

Once an agreement or contract has been established between the UAS data management system 116 and a UAS operator to perform a requested data gathering task, the selected UAS may gather the requested data during the planned flight of the UAS. If the data gathering task requires any modifications to the UAS flight plan, the flight management software 260 may transmit the modifications to the UTM network 114, which may update the flight plan of the scheduled UAS flight. During the flight of the UAS, the UAS may gather the requested data and may transmit the gathered data to the UAS data management system 116. The gathered data may be received by the data reception module 268. The received data may then be stored in the UAS sensor data warehouse 248 and/or transmitted to one or more customers via the customer data request handler 244 or the customer data subscription handler 246, as described above. In some examples, data may be validated to ensure it meets required constraints before being transmitted to customers. In some examples, a payment to a UAS operator providing data may only be made if the data received from the customer is validated as adequate.

Figure 3:
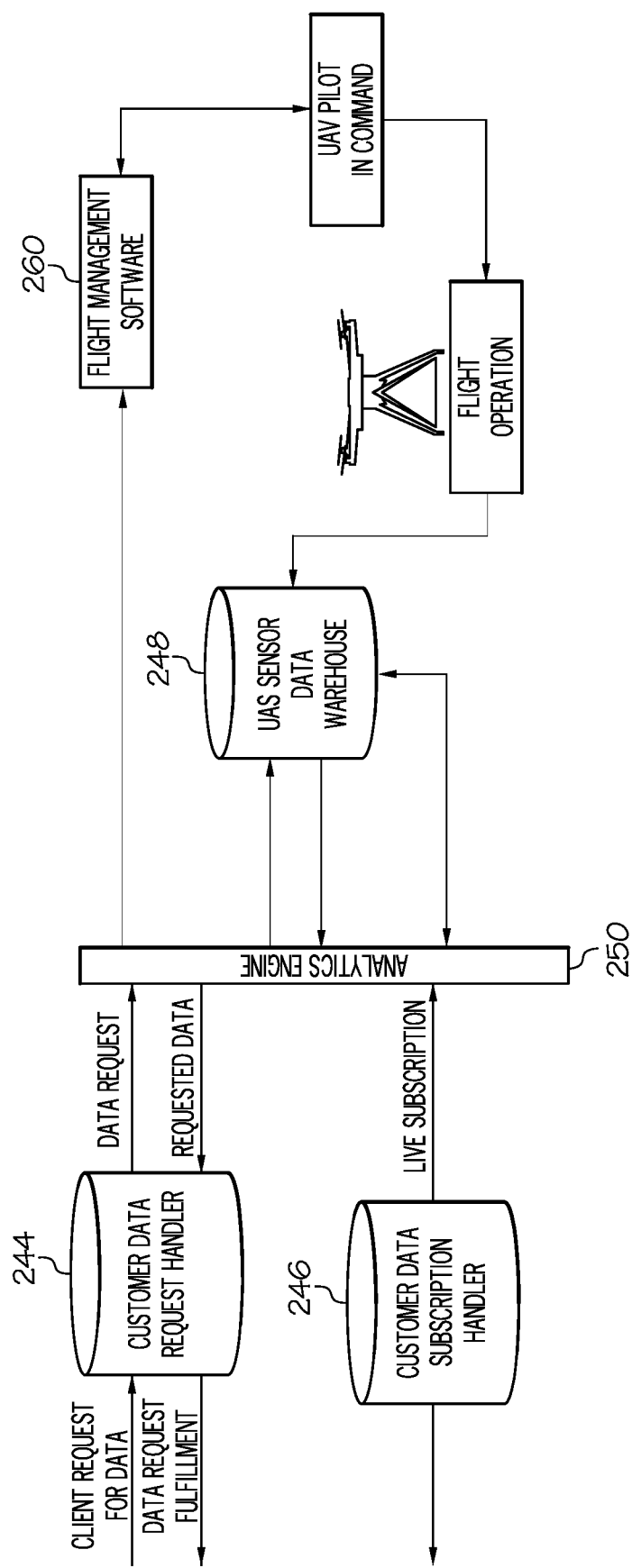
FIG. 3 depicts a diagram of data flow during operation of the UAS data management system, according to one or more embodiments shown and described herein.

Turning now to FIG. 3, a diagram illustrating a data flow through the UAS data management system 116 is shown. A client request for data may be received by the customer data request handler 244. The data request may then be transmitted to the analytics engine 250. The analytics engine 250 may determine whether the requested data is available in the UAS sensor data warehouse 248. If the data is available in the UAS sensor data warehouse 248, then the analytics engine 250 may retrieve the data from the UAS sensor data warehouse 248 and transmit the retrieved data to the customer data request handler 244. The customer data request handler 244 may then transmit the requested data to the requesting client.

If the analytics engine 250 determines that the requested data is not available in the UAS sensor data warehouse 248, the analytics engine 250 may determine whether the data can be gathered by one or more UAS. For example, if a customer requests historical weather data that is not available in the UAS sensor data warehouse 248, then it will be impossible to gather the requested historical weather data using future UAS flights. If the analytics engine 250 determines that the requested data is not available in the UAS sensor data warehouse 248 and cannot be collected using future UAS flights, the analytics engine 250 may cause the customer data request handler 244 to transmit a message to the customer requesting the data indicating that the data is not available and cannot be collected.

If the analytics engine 250 determines that the data can be gathered using future UAS flights, then the analytics engine 250 may transmit the request to the flight management software 260. The flight management software 260 may then transmit a request to one or more UAS operators (UAV pilots in command) to gather the requested data. The flight management software 260 may then establish an agreement or contract with a UAS operator to gather the requested data using the techniques described above. A UAS may then gather the data during a flight operation and may transmit the gathered data to the UAS data management system 116, which may be stored in the UAS sensor data warehouse 248. The gathered data may then be transmitted to a client via the customer data request handler 244 or streamed to subscribing customers via the customer data subscription handler 246.

Figure 4:
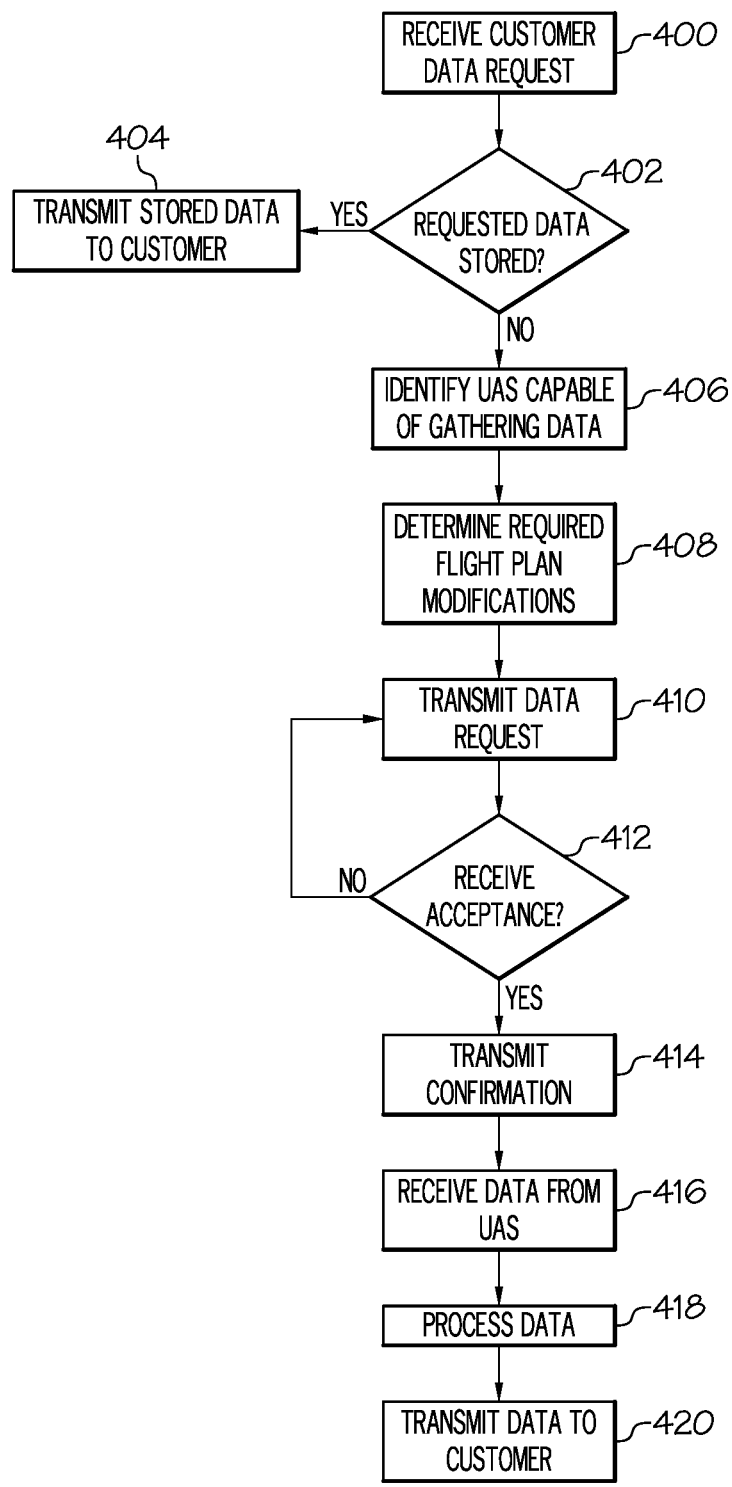
FIG. 4 depicts a flow chart of a method of operating the UAS data management system, according to one or more embodiments shown and described herein.

Referring now to FIG. 4, a flow chart is shown of an example method of operating the UAS data management system 116 of FIGS. 1-3. At step 400, the customer data request handler 244 may receive a customer data request. Specifically, the customer data request handler 244 may receive a request for data comprising one or more requirements or constraints.

At step 402, the data request reception module 252 may receive the customer data request and the data warehouse search module 254 may search the UAS sensor data warehouse 248 to determine whether the requested data is stored therein. If the data warehouse search module 254 determines that the requested data is stored in the UAS sensor data warehouse 248 (yes at step 402), then, at step 404, the customer data request handler 244 may transmit the requested data from the UAS sensor data warehouse 248 to the customer. If the data warehouse search module 254 determines that the requested data is not stored in the UAS sensor data warehouse 248 (no at step 402), then control may continue to step 406.

At step 406, the UAS identification module 262 may identify one or more UAS capable of gathering the requested data based on scheduled flight plans for UAS stored with the UTM network 114. At step 408, the UAS identification module 262 may determine any modifications to UAS flight plans that may be required for the UAS to gather the requested data. The UAS identification module 262 may also determine any modifications that may be required to the payload of the UAS to gather the requested data (e.g., the UAS may need to install an additional sensor).

At step 410, the data request transmission module 264 may transmit a request to gather the requested data to an operator of a UAS identified as capable of gathering the data. The request may indicate the data to be gathered, any modifications to a flight plan required to be made for the UAS to gather the data, and any compensation to be offered for gathering the data. In some examples, the data request transmission module 264 may transmit the request to gather the requested data to multiple UAS operators.

At step 412, the data request confirmation reception module 266 may receive an acceptance or denial from the UAS operator indicating whether or not the UAS operator is willing to perform the requested data gathering task. If the data request confirmation reception module 266 receives a denial of the request to gather the data (no at step 412), then control returns to step 410 and the data request transmission module 264 may transmit the request to gather the requested data to a different UAS operator of a UAS capable of gathering the requested data. If the data request confirmation reception module 266 receives an acceptance of the request to gather the data (yes at step 412), then, at step 414, the data request confirmation reception module 266 may transmit a confirmation to the UAS operator indicating that the UAS data management system 116 has received the acceptance from the UAS operator.

At step 416, during the flight of the UAS, the data reception module 268 may receive the requested data from the UAS as the UAS gathers the data and the received data may be stored in the UAS sensor data warehouse 248. At step 418, the data processing module 256 may process the data received from the UAS.

At step 420, the processed data may be transmitted to the customer that requested the data. In some examples, the customer data request handler 244 may transmit the processed data to the customer. In other examples, the customer data subscription handler 246 may transmit the received data to one or more subscribers as the data is received by the UAS data management system 116 in real time.

It should now be understood that the devices, systems, and methods described herein provide demand driven crowdsourcing for UAS sensor data. A customer may transmit a request for data to be gathered by one or more UAS to a UAS data management system. The UAS data management system may determine whether the requested data has previously been gathered and stored in a UAS sensor data warehouse. If the data has previously been gathered and stored, it may be retrieved and sent to the customer. If the data has not previously been gathered and stored, the system may identify UAS having upcoming scheduled flight plans that are capable of gathering the requested data. The system may also identify modifications that may need to be made to a scheduled flight plan to gather the data.

After one or more UAS are identified that are capable of gathering the requested data, a request may be sent to one or more operators of one or more UAS inquiring as to whether the UAS operators are willing to gather the requested data. The request may indicate any modifications needed to a scheduled flight plan as well as compensation being offered. UAS operators may decide whether to accept the request to gather the data during upcoming UAS flights. If a UAS operator accepts the request to gather the data during an upcoming UAS flight, the flight plan of the UAS may be modified if necessary to perform the data gathering task. The UAS may then be flown on the originally scheduled or modified flight plan and may gather the data during the flight. As the data is gathered, the data may be transmitted to and stored by the UAS data management system. The system may then process the data and either transmit the processed data to the customer that requested the data or stream the data to one or more subscribers as the data is received in real time.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses.

A method comprising receiving a request for a first set of data to be gathered by an unmanned aircraft system; identifying a first unmanned aircraft system capable of gathering the first set of data; transmitting a request to the first unmanned aircraft system to gather the first set of data; and receiving the first set of data gathered by the first unmanned aircraft system.

The method of any preceding clause, further comprising upon receiving a denial of the request from the first unmanned aircraft system, identifying a second unmanned aircraft system capable of gathering the first set of data, and transmitting the request to the second unmanned aircraft system to gather the first set of data.

The method of any preceding clause, further comprising identifying planned routes of one or more unmanned aircraft systems; and determining that the first unmanned aircraft system is capable of gathering the first set of data if at least a portion of a planned route of the first unmanned aircraft system is within a predetermined threshold distance of a location where the first set of data is to be gathered.

The method of any preceding clause, further comprising determining times that the planned routes of the one or more unmanned aircraft systems are to occur; and determining that the first unmanned aircraft system is capable of gathering the first set of data if a planned route of the first unmanned aircraft system is to occur or may be modified to occur at a time during which the first set of data is to be gathered.

The method of any preceding clause, further comprising identifying a planned route of the first unmanned aircraft system; and transmitting, as part of the request to the first unmanned aircraft system, a recommended modification to the planned route to gather the first set of data.

The method of any preceding clause, further comprising determining compensation to be paid to the first unmanned aircraft system for gathering the first set of data; and transmitting, as part of the request to the first unmanned aircraft system, information on the compensation.

The method of any preceding clause, further comprising determining one or more sensors capable of gathering the first set of data; and determining that the first unmanned aircraft system is capable of gathering the first set of data if the first unmanned aircraft system has the determined one or more sensors.

The method of any preceding clause, further comprising determining one or more sensors capable of gathering the first set of data; determining whether the first unmanned aircraft system has the determined one or more sensors; and upon determination that the first unmanned aircraft system does not have the determined one or more sensors, transmitting, as part of the request to the first unmanned aircraft system, information on the determined one or more sensors.

The method of any preceding clause, further comprising after receiving the first set of data gathered by the unmanned aircraft system, storing the first set of data in a data warehouse.

The method of any preceding clause, further comprising determining whether the first set of data is stored in a data warehouse; and upon determination that the first set of data is stored in the data warehouse, transmitting the first set of data from the data warehouse to a requestor of the first set of data.

The method of any preceding clause, further comprising identifying a second unmanned aircraft system capable of gathering the first set of data; determining which of the first unmanned aircraft system and the second unmanned aircraft system will incur lower costs in gathering the first set of data; and transmitting the request to gather the first set of data to the determined one of the first unmanned aircraft system and the second unmanned aircraft system that will incur lower costs in gathering the first set of data.

The method of any preceding clause, further comprising identifying a second unmanned aircraft system capable of gathering the first set of data; soliciting bids from each of the first unmanned aircraft system and the second unmanned aircraft system to gather the first set of data; and selecting one of the first unmanned aircraft system and the second unmanned aircraft system based on the bids received from each of the first unmanned aircraft system and the second unmanned aircraft system.

The method of any preceding clause, further comprising processing the received first set of data to remove private information associated with the first unmanned aircraft system; and transmitting the processed first set of data to a requestor of the first set of data.

The method of any preceding clause, further comprising as the first set of data is received, streaming the first set of data to one or more subscribers in real time.

An apparatus comprising one or more processors; one or more memory modules; and machine-readable instructions stored in the one or more memory modules that, when executed by the one or more processors, cause the apparatus to receive a request for a first set of data to be gathered by an unmanned aircraft system; identify a first unmanned aircraft system capable of gathering the first set of data; transmit a request to the first unmanned aircraft system to gather the first set of data; and receive the first set of data gathered by the first unmanned aircraft system.

The apparatus of any preceding clause, wherein the machine-readable instructions, when executed, further cause the apparatus to identify a planned route of the first unmanned aircraft system; and transmit, as part of the request to the first unmanned aircraft system, a recommended modification to the planned route to gather the first set of data.

The apparatus of any preceding clause, wherein the machine-readable instructions, when executed, further cause the apparatus to determine one or more sensors capable of gathering the first set of data; determine whether the first unmanned aircraft system has the determined one or more sensors; and upon determination that the first unmanned aircraft system does not have the determined one or more sensors, transmit, as part of the request to the first unmanned aircraft system, information on the determined one or more sensors.

The apparatus of any preceding clause, wherein the machine-readable instructions, when executed, further cause the apparatus to after receiving the first set of data gathered by the unmanned aircraft system, store the first set of data in a data warehouse.

The apparatus of any preceding clause, wherein the machine-readable instructions, when executed, further cause the apparatus to determine whether the first set of data is stored in a data warehouse; and upon determination that the first set of data is stored in the data warehouse, transmit the first set of data from the data warehouse to a requestor of the first set of data.

The apparatus of any preceding clause, wherein the machine-readable instructions, when executed, further cause the apparatus to as the first set of data is received, stream the first set of data to one or more subscribers in real time.

What is claimed is:

1. A method comprising:
receiving a request for a first set of data to be gathered by an unmanned aircraft system at a first location;
identifying a first unmanned aircraft system among one or more unmanned aircraft systems having a first flight plan such that at least a portion of a planned route associated with the first flight plan is within a predetermined threshold distance of a first location where the first set of data is to be gathered;
determining a second flight plan comprising a modification of the planned route such that the first unmanned aircraft system may gather the first set of data at the first location;
transmitting the second flight plan and a request to the first unmanned aircraft system to gather the first set of data;
determining one or more sensors capable of gathering the first set of data;
determining whether the first unmanned aircraft system has the determined one or more sensors;
upon determination that the first unmanned aircraft system does not have the determined one or more sensors, transmitting, as part of the request to the first unmanned aircraft system, information on the determined one or more sensors to be added to the first unmanned aircraft system before a flight associated with the second flight plan;
updating the first flight plan of the first unmanned aircraft system to the second flight plan; and
receiving the first set of data gathered by the first unmanned aircraft system.

2. The method of claim 1, further comprising:
upon receiving a denial of the request from the first unmanned aircraft system, identifying a second unmanned aircraft system capable of gathering the first set of data; and
transmitting the request to the second unmanned aircraft system to gather the first set of data.

3. The method of claim 1, further comprising:
identifying the first unmanned aircraft system among the one or more unmanned aircraft systems such that the planned route of the first unmanned aircraft system is to occur or may be modified to occur at a time during which the first set of data is to be gathered.

4. The method of claim 1, further comprising:
determining compensation to be paid to the first unmanned aircraft system for gathering the first set of data; and
transmitting, as part of the request to the first unmanned aircraft system, information on the compensation.

5. The method of claim 1, further comprising:
determining one or more sensors capable of gathering the first set of data; and
determining that the first unmanned aircraft system is capable of gathering the first set of data if the first unmanned aircraft system has the determined one or more sensors.

6. The method of claim 1, further comprising:
after receiving the first set of data gathered by the unmanned aircraft system, storing the first set of data in a data warehouse.

7. The method of claim 1, further comprising:
determining whether the first set of data is stored in a data warehouse; and
upon determination that the first set of data is stored in the data warehouse, transmitting the first set of data from the data warehouse to a requestor of the first set of data.

8. The method of claim 1, further comprising:
identifying a second unmanned aircraft system capable of gathering the first set of data;
determining which of the first unmanned aircraft system and the second unmanned aircraft system will incur lower costs in gathering the first set of data; and
transmitting the request to gather the first set of data to the determined one of the first unmanned aircraft system and the second unmanned aircraft system that will incur lower costs in gathering the first set of data.

9. The method of claim 1, further comprising:
identifying a second unmanned aircraft system capable of gathering the first set of data;
soliciting bids from each of the first unmanned aircraft system and the second unmanned aircraft system to gather the first set of data; and
selecting one of the first unmanned aircraft system and the second unmanned aircraft system based on the bids received from each of the first unmanned aircraft system and the second unmanned aircraft system.

10. The method of claim 1, further comprising:
processing the received first set of data to remove private information associated with the first unmanned aircraft system; and
transmitting the processed first set of data to a requestor of the first set of data.

11. The method of claim 1, further comprising:
as the first set of data is received, streaming the first set of data to one or more subscribers in real time.

12. An apparatus comprising:
one or more processors;
one or more memory modules; and
machine-readable instructions stored in the one or more memory modules that, when executed by the one or more processors, cause the apparatus to:
receive a request for a first set of data to be gathered by an unmanned aircraft system at a first location;
identify a first unmanned aircraft system among one or more unmanned aircraft systems having a first flight plan such that at least a portion of a planned route associated with the first flight plan is within a predetermined threshold distance of a first location where the first set of data is to be gathered;
determine a second flight plan comprising a modification of the planned route such that the first unmanned aircraft system may gather the first set of data at the first location;
transmit the second flight plan and a request to the first unmanned aircraft system to gather the first set of data;
determine one or more sensors capable of gathering the first set of data;
determine whether the first unmanned aircraft system has the determined one or more sensors;
upon determination that the first unmanned aircraft system does not have the determined one or more sensors, transmit, as part of the request to the first unmanned aircraft system, information on the determined one or more sensors to be added to the first unmanned aircraft system before a flight associated with the second flight plan;
update the first flight plan of the first unmanned aircraft system to the second flight plan; and
receive the first set of data gathered by the first unmanned aircraft system.

13. The apparatus of claim 12, wherein the machine-readable instructions, when executed, further cause the apparatus to:
after receiving the first set of data gathered by the unmanned aircraft system, store the first set of data in a data warehouse.

14. The apparatus of claim 12, wherein the machine-readable instructions, when executed, further cause the apparatus to:
determine whether the first set of data is stored in a data warehouse; and
upon determination that the first set of data is stored in the data warehouse, transmit the first set of data from the data warehouse to a requestor of the first set of data.

15. The apparatus of claim 12, wherein the machine-readable instructions, when executed, further cause the apparatus to:
as the first set of data is received, stream the first set of data to one or more subscribers in real time.

* * * * *